May 6, 1952 W. O. GASSETT 2,595,518
TESTING APPARATUS
Filed Aug. 9, 1946 2 SHEETS—SHEET 1

W. O. GASSETT
INVENTOR.
BY
ATTORNEYS.

May 6, 1952 W. O. GASSETT 2,595,518
TESTING APPARATUS
Filed Aug. 9, 1946 2 SHEETS—SHEET 2

WILLIAM O. GASSETT
*INVENTOR.*
BY
ATTORNEYS.

Patented May 6, 1952

2,595,518

UNITED STATES PATENT OFFICE 2,595,518

TESTING APPARATUS

William O. Gassett, Dearborn, Mich., assignor to Ford Motor Company, Dearborn, Mich., a corporation of Delaware Application August 9, 1946, Serial No. 689,461

2 Claims. (Cl. 250—20)

1

This application is concerned with a testing apparatus designed particularly for rapid, routine checking of finished radio sets designed for mobile applications, but it is by no means limited to this specific type of work. The testing apparatus upon which this application is predicated is especially designed to give a final and accurate measure of the overall performance of the finished radio set immediately prior to shipping or installation and to reduce errors and labor in such a testing operation to a minimum. Applicant's testing apparatus permits twenty-two distinct tests to be made upon the finished radio in a comparatively short length of time.

Each individual radio set is tested at seven frequencies ranging from 550 to 1600 kilocycles. This range is of course the frequency band used in commercial broadcasting. At each of the seven test frequencies, the output of the radio set is tested at a modulated, fixed high signal input, at a modulated, fixed low signal input and with an unmodulated signal. In addition to the above enumerated tests provision is made for a measurement of the total power input to the set. Provision is also made for the accommodation of two radio sets, one being actually under test and the other being in the process of heating up prior to testing.

Accordingly an object of this invention is to provide an apparatus which will permit the rapid and economical testing of finished radio sets under conditions which simulate actual usage.

A further object is to provide an apparatus which will permit a single operator to simultaneously handle two radio sets.

With these and other objects in view, the invention consists in the arrangement, construction and combination of the various parts of the improved structure as described in the specification, claimed in the claims and illustrated in the accompanying drawings, in which:

Basically the testing apparatus depends for its operation upon seven radio frequency oscillators, preferably crystal controlled. The preferred frequencies of these oscillators are 1600, 1400, 1200, 1000, 800, 600 and 550 kilocycles. The outputs of all of the oscillators are fed into a single buffer amplifier. The mixed and amplified signal which emanates from the buffer am-

2 plifier contains all of the frequencies derived from the oscillators. This mixed and amplified signal is fed into an attenuator which is basically three resistances in series. The outgoing signal which is delivered to the radio under test is taken off at selected points along this attenuating resistance. A selector switch is provided to enable the operator to choose an appropriate output signal level.

Signal modulation is provided for by an audio frequency oscillator. It is preferred to operate this oscillator at the standard frequency of 400 cycles per second. Provision is made whereby this 400 cycle oscillator can be connected to or disconnected from the input of the buffer amplifier to provide a modulated or unmodulated signal.

A connection is built into the testing apparatus for measuring the output of the radio under test. The actual measurement is done with a milliwatt meter having appropriate resistances and switching facilities to enable measurements of radio output at levels up to as high as ten watts. A fixed resistance of 3.2 ohms is shunted across the output of the radio set under test to simulate the resistance of a standard speaker coil.

Figure 1:
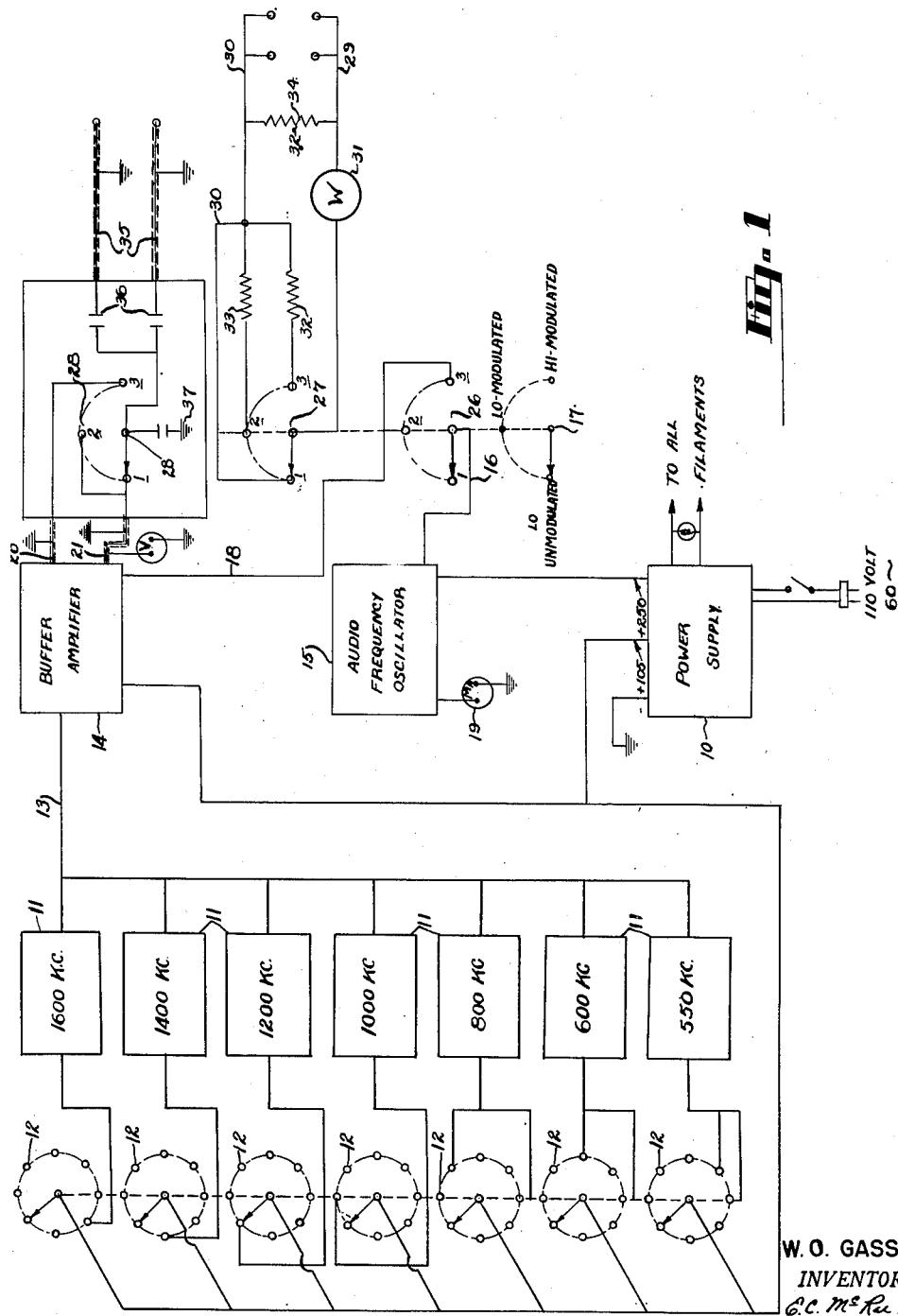
Figure 1 is a schematic diagram of the testing apparatus.

Turning to Figure 1, the power supply unit is indicated at 10. Power supply unit 10 is supplied with the usual 110 volts, 60 cycle alternating current and in turn supplies raw alternating current at 6.3 volts to operate the pilot light and all filaments, and rectified and filtered direct current at 105 and 250 volts as a plate supply.

The testing signals in this apparatus originate in the crystal controlled oscillators indicated at 11. These oscillators cover that portion of the radio frequency spectrum assigned to commercial broadcasting and are set to operate at the frequencies indicated. The output of these oscillators is controlled by a seven pole, eight position switch 12 by means of which the output of any individual oscillator or all of them simultaneously as desired may be connected to oscillator outlet leads 13. Oscillator outlet leads 13 terminate in buffer amplifier 14.

The modulation necessary for radio set testing is provided by audio frequency oscillator 15. It is preferred to operate this oscillator at the standard pitch of 400 cycles. Power for this oscillator is obtained from the 250 volt tap on power supply unit 10. The output of audio frequency oscillator 15 is conducted by lead 16 to three-way, three-position switch 17, the functions of which will become apparent as the description proceeds. From switch 17, lead 18 conducts the output of audio frequency oscillator to the input buffer amplifier 14. Milliameter 19 is connected to audio frequency oscillator 15 to provide a check upon the output of this oscillator.

Figure 3:
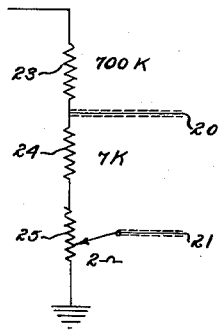
Figure 3 is a schematic diagram of the attenuating resistor circuit.

The output of buffer amplifier 14 is led to ground through three resistors arranged in series as shown in Figure 3. The output of this oscillator first passes through resistor 23 having a resistance of 700,000 ohms, then into resistor 24 having a value of 7,000 ohms and finally through variable resistor 25 with a maximum value of 2 ohms, to ground. The value of variable resistor 25 is adjusted so that the output of the oscillators 11 as amplified by buffer amplifier 14 will approximate 5 microvolts in shielded lead 21 and 500 microvolts in shielded lead 20. A variable resistor is provided in the plate circuit of each of the oscillators 11 so that these oscillators can be individually adjusted to give precisely 5 microvolts in shielded lead 21. These individual adjustments of each oscillator would of course be made after the proper setting of resistor 25 had been made.

As shown in Figure 1, three-way, three-position switch 17 gives three panel indications, i. e., "low, unmodulated," "low modulated" and "high modulated." At the "low, unmodulated" position, an unmodulated signal with an amplitude of 5 microvolts is impressed upon the radio set undergoing test. At the "low modulated" position, a similar signal is delivered, except it is modulated to an extent of approximately 30% by the 400 cycle per second oscillation from audio frequency oscillator 15. At the "high modulated" position of switch 17, a similarly modulated signal is delivered and with an amplitude of 500 microvolts. The output of audio frequency modulator 15 is conducted by lead 16 to the contactor of pole 26 of switch 17. Button 1 of pole 26 is left blank and buttons 2 and 3 are connected to lead 18. Thus pole 26 serves to connect or disconnect audio frequency modulator 15 from buffer amplifier 14. The output of the radio set under test is received in leads 29 and 30 and measured in milliwatt meter 31. A fixed resistor 34 having a value of 3.2 ohms is shunted across leads 29 and 30 to simulate the speaker coil. The output of the set being tested passes from lead 29 through milliwatt meter 31 and to the contactor of pole 27 of switch 17. Button 1 of pole 27 is directly connected to lead 30. Buttons 2 and 3 are connected to lead 30 through resistors 33 and 32 respectively having resistances chosen to give outputs of 2 and 10 watts respectively with full scale deflections of wattmeter 31. Leads 35 are connected to the set under test and are coupled with the output of buffer amplifier 14 through pole 28 of switch 17 and condensers 36 and 37. Condensers 36 and 37 have a capacitance of 30 micro-micro farads which results in an approximation of the capacitance of an automobile aerial. The input sides of condensers 36 and 37 are connected to the contactor of pole 28. Buttons 1 and 2 of pole 28 are connected to lead 21 which carries the 5 microvolt output of buffer amplifier 14. Button 3 of pole 28 is connected to lead 20 which carries the 500 microvolt output of buffer amplifier 14.

Figure 2:
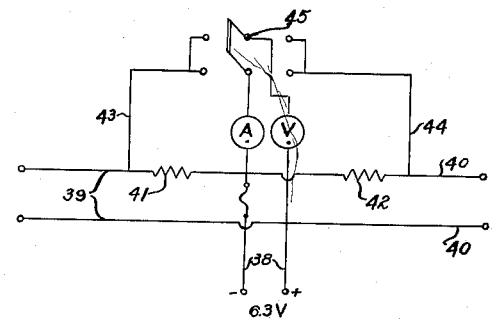
Figure 2 is a schematic diagram of the circuit used to test the power input to the radio.

Figure 2 is a wiring diagram of the power supply to the radio set on test. Here power is received via leads 38 at 6.3 volts, direct current. Leads 39 and 40 are provided so that power can be supplied to two radio receivers simultaneously. With double-pole, double-throw switch 45 in the open or intermediate position, all current flowing to the receivers must pass through resistor 41 or 42. When it is desired to measure the current and voltage applied to the radio set connected to leads 39, double-pole, double-throw switch 45 is moved to the left connecting the voltmeter across the leads to the radio set, and shunting a portion of the current through lead 43. The resistances of the ammeter and resistor 41 are so selected that a true reading of the current to the receiver is obtained. Similarly when it is desired to ascertain the current and voltage applied to the right-hand radio set connected to leads 40, double-pole, double-throw switch 45 is thrown to the right and the bulk of the current passed through lead 44.

The receivers to be tested would have their speakers disconnected and the wires normally leading to the speakers would be connected to leads 29 and 30. The normal aerial connection of the set would be attached to one of leads 35. To expedite testing, two receivers are normally connected to the power supply at once. One of these sets is warming up, while the other is being actually tested. Thus there is no necessity for the operator to wait the 15 or 20 seconds required for the tubes to reach operating temperature.

Assuming a radio receiver to be tested already connected properly to leads 29, 30 and 35, seven-pole, eight-throw switch 12 would be set so that the output of all of the oscillators 11 would be fed into buffer amplifier 14. Three-pole, three-position switch 17 is now placed in the No. 1 position. This is the position employed for making the tests with the low strength, unmodulated signal. In this position, the audio frequency oscillator 15 is cut out of the circuit, milliwatt meter 31 is connected directly to the output of the radio set, and leads 35 are connected to the juncture of resistors 24 and 25 so that an unmodulated signal of 5 microvolts is impressed upon the radio set at the seven different frequencies. The operator now tunes the radio set over the entire broadcast band and notes the reading on milliwatt meter 31. Since there is no modulation of the impressed signal, the reading of milliwatt meter 31 should be a minimum since all output of the radio set at this setting of switch 17 represents "noise." To pass this part of the test, the reading of milliwatt meter 31 should not exceed a predetermined maximum. For the next portion of the test, switch 17 is placed in position No. 2. This modifies the circuit to the extent of connecting audio frequency oscillator 15 to buffer amplifier 14 and of connecting resistor 33 in series with milliwatt meter 31 and leads 29 and 30. The radio set under test now receives a signal comprising the mixture of frequencies produced by oscillators 11, modulated to the extent of about 30% with the 400 cycle output of audio frequency oscillator 15. The strength of this signal is again 5 microvolts. As a result of the modulation, the output of the set under test is enormously increased. Consequently the added resistance of resistor 33 is required to obtain proper current values for registration by milliwatt meter 31. The operator now tunes the radio set to each of the frequencies furnished by the oscillators and notes the reading of milliwatt meter 31 at each of these seven points. Each of these readings should be above a predetermined minimum. This phase of the test is designed to give a measure of the performance of the radio set when receiving a weak signal such as would be obtained from a distant broadcasting station. For the final part of the test, switch 17 is thrown to the No. 3 position. This modifies the circuit again by connecting leads 35 to the juncture of resistors 23 and 24 and placing resistor 32 in series with milliwatt meter 31 and leads 29 and 30. The operator again tunes the radio set under test to the frequency of each of the oscillators 11 and notes the reading on milliwatt meter 31. The radio set is now receiving a signal comprising a mixture of all of the chosen frequencies modulated about 30% by the 400 cycle output of audio frequency oscillator 15 and with a strength of 500 microvolts. This signal is ample to insure a maximum output from the radio set under test. The reading of milliwatt meter 31 at each of the frequencies should be above a predetermined minimum. The values of resistors 33 and 32 and the characteristics of milliwatt meter 31 are so chosen that at direct connection, full scale reading represents 200 milliwatts. With resistor 33 in series with the meter a full scale reading will be 2 watts, and with resistor 32 in series a full scale reading will be 10 watts. These three wattages represent respectively values above that to be encountered with a 5 microvolt, unmodulated signal, a 5 microvolt, modulated signal, and a 500 microvolt modulated signal.

From a consideration of the foregoing, it will be seen that an apparatus has been provided which makes possible the rapid and accurate testing of radio receivers under conditions closely approximating that encountered in normal service. This test discloses the highest noise level of the set under test over the entire broadcast band, the output of the radio set on a weak signal at selected frequencies covering the broadcast band and the maximum output possible at each of these selected frequencies. A further determination is made of the current drain of each of the radio sets under operating conditions and at a known voltage.

What is claimed is:

1. A radio receiver testing device comprising means for producing a mixture of radio frequencies, means for producing audio frequency energy for the modulation of the radio frequencies, amplifying means, switching mechanism for interconnecting the amplifier, the audio frequency producing means and the radio frequency producing means, attenuating means for adjusting the output of the amplifier to the desired level, an outlet to feed the output of the amplifier into a radio receiver to be tested, metering devices to measure the output of said receiver and means for adjusting the sensitivity of the metering devices to accommodate the attenuation of the output level of the amplifier.

2. A radio receiver testing device comprising a plurality of oscillators for producing a mixture of definite radio frequencies in the range of 550 kilocycles to 1600 kilocycles, an oscillator for producing audio frequency energy for modulating the output of the radio frequency oscillators, an amplifier connected to receive the output of the radio frequency and audio frequency oscillators, means for attenuating the output of said amplifier and feeding said output to a radio receiver to be tested, metering means for measuring the output of said radio receiver and a switching mechanism to adjust the sensitivity of the metering means to the degree of attenuation of the amplifier.

WILLIAM O. GASSETT.

REFERENCES CITED

The following references are of record in the file of this patent:

UNITED STATES PATENTS

| Number | Name | Date |
| --- | --- | --- |
| 1,472,218 | Hammond | Oct. 30, 1923 |
| 1,793,601 | Ferris | Feb. 24, 1931 |
| 1,799,976 | Falknor | Apr. 7, 1931 |
| 1,896,847 | Lieberum | Feb. 7, 1933 |
| 1,911,362 | Hickok | May 30, 1933 |
| 1,956,350 | Hammond | Apr. 24, 1934 |
| 2,215,197 | Sherman | Sept. 17, 1940 |
| 2,347,826 | Heisner | May 2, 1944 |
| 2,355,275 | Cawein | Aug. 8, 1944 |
| 2,409,845 | Gardiner et al. | Oct. 22, 1946 |

OTHER REFERENCES

Radio Amateur's Handbook, published 1942 by American Radio Relay League, page 243.